United States Patent
Webb et al.

[11] Patent Number: 6,160,249
[45] Date of Patent: Dec. 12, 2000

[54] ADAPTIVE RESOLUTION SCANNING

[75] Inventors: Steven L. Webb, Loveland; Dan S. Johnson, Greeley, both of Colo.

[73] Assignee: Hewlett-Packard Company, Palo Alto, Calif.

[21] Appl. No.: 09/168,706

[22] Filed: Oct. 8, 1998

[51] Int. Cl.[7] .................................................. H01L 27/00

[52] U.S. Cl. ......................... 250/208.1; 348/97; 358/474

[58] Field of Search .................. 250/208.1; 348/97–101, 348/195, 207; 358/473, 474, 487, 489, 493, 494; 382/318, 319

[56] References Cited

U.S. PATENT DOCUMENTS

| | | | |
|---|---|---|---|
| 4,903,142 | 2/1990 | Hasebe et al. | 358/457 |
| 5,218,457 | 6/1993 | Burkhardt et al. | 358/448 |
| 5,930,410 | 7/1999 | Webb et al. | 382/312 |

*Primary Examiner*—Stephone B. Allen
*Attorney, Agent, or Firm*—Steven L. Webb

[57] ABSTRACT

A method of adjusting the resolution of a scan based on the scan area or the scan window size. The smaller the scan window size, the higher the scan resolution would be. The final scan resolution is a function of an initial resolution, a resolution modifier, a printer factor, and an image factor. The resolution modifier, the printer factor and the image factor are dependent on the scan window size, the system printer, and the scan image type respectively.

6 Claims, 2 Drawing Sheets

ADAPTIVE RESOLUTION SCANNING

FIELD OF THE INVENTION

This invention relates generally to scanners, copiers, facsimile machines and other devices used for transforming an optical image of a document into a electronic signal and more specifically to automatically determining the correct resolution for the electronic representation.

BACKGROUND OF THE INVENTION

Electronic document scanners and facsimile machines transform an optical image of a document into an electric signal suitable for storing, displaying, printing or electronic transmission. These devices typically use illumination and optical systems to illuminate the object and focus a small area of the illuminated object, usually referred to as the "scan line", onto an optical photosensor array. This direction is typically called the scan width or X-direction. The entire object is then scanned by sweeping the illuminated scan line across the entire object, either by moving the object with respect to the illumination and optical assemblies, or by moving the illumination and optical assemblies relative to the object. This is typically called the scan length or Y-direction.

An optical scanner has a native or optical resolution that is the maximum sample rate of the object to be scanned. In a typical scanner this resolution is usually 600 or 1200 samples or pixels per inch (ppi). Typically a scanner can scan at a range of resolutions or sample rates ranging from a small fraction (1/20) of the optical resolution up to 2 times the optical resolution. For example a scanner with an optical resolution of 600 ppi could scan using a resolution ranging from 30 ppi up to 1200 ppi.

Scanners typically have the ability to scan the object using different image types. The different image types typically vary the amount of information stored for each sample or pixel. Some of the image types of a typical scanner are full color scans, grayscale scans, and line art or black and white scans. For a line art scan the image is either black or white. This type of image would contain one bit of information for each pixel in the image. Grayscale scans typically represent the image as one of 256 levels of gray for each pixel. Therefore, grayscale scans can be represented by 8 bits of information for each pixel in the image. For a full color scan the scanner typically generates a red, green, and blue component. Each component is 8 bits (or 256 levels), for a total of 24 bits (or three bytes) of information for each pixel in the full color image.

Images that scanners scan range in size from small objects or photos up to full pages. Typically scanners allow the size of the scanned area or window to be adjusted to match the size of the object to be scanned. A typical scanner allows the window to be adjusted in the x and y directions from one pixel in length up to the full size of the scanning bed.

One of the reasons that scanners have different resolution and image types is to allow the trade off between the required image quality and the image size. If each image was scanned as a color image at the maximum resolution the size of the file would typically be too large. For example an 8.5×11 inch image scanned as a full color image at 600×600 ppi resolution would contain 100.98 megabytes (8.5 * 11 * 600 * 600 * 3).

The electronic images created by the scanner are used in a large number of Ways. Some images are enlarged and then printed, some are reduced and printed, some are printed at the same size as the original. Some images are displayed on computer displays, some images are faxed. Some of the images are printed on very high-resolution color printers, and some are printed on lower resolution black and white printers. The end use of the image helps determine the resolution and data type needed for the scan. Typically the resolution of the scan is proportional to the resolution of the printer to be used. For example a scan to be printed on a 1200 dot per inch (dpi) printer would need to be scanned at a higher resolution than a scan to be printed on a 300 dpi printer. Typically computer displays have much lower resolutions than printers, therefore the image scanned for a computer display need not be scanned at as high a resolution as an image scanned for a printer.

The end use of the image also helps determines the image type for the scan. A scan to be printed on a black and white printer would not be scanned as a color image because it would be three times the size of the black and white image. The image type can also affect the required scan resolution. Typically a color image needs a lower scanned resolution than a line art image.

Typically scanners can enlarge or reduce (scale) the output size of an image. The amount of enlargement or reduction of the image affects the optimum resolution for the scan. The required resolution is typically proportional to the amount of enlargement. For example an image to be enlarged by 3 times would require a resolution 3 time greater than an image that was to be printed at the same size as the original image.

Setting the optimal resolution and image type to give the best quality image while minimizing memory requirements is a complex task. Scanning has moved into areas where non-experts do the scanning. Selecting the optimal resolution and image type has become a task for the scanning solution and not for the user. Scanning solutions currently make use of the destination or end use of the scanned image and the final size or scaling of the image to select the resolution and image type. For example the user would choose between destinations that include a plurality of printer types, the computer display screen, and fax types. The scanning solution, using the known output resolutions and capabilities of these destinations and the final image size, would select the optimal resolution and image type for the scanned image.

Today scanned images often are used more than one time. The scanned image stored on a computer may be used for creating multiple outputs. For example a scanned image may be used to create a small part of an advertisement and then that same image may be enlarged and printed in a news letter. If the scanned image was originally created for a small image size (at a lower resolution) and then printed at a large size, the larger sized image will not be of proper output quality. There is a need for the scanning solution to be able to predict the final image output size or scaling such that the scanning resolution can be correctly selected.

SUMMARY OF THE INVENTION

A method to determine the final scanning resolution of an image based on the scan window size or scanned area. The smaller the scan window size, the higher the scan resolution would be. The final scan resolution is a function of an initial solution, a resolution modifier, a printer factor, and an image factor. The resolution modifier, the printer factor and the image factor are dependent on the scan window size, the system printer, and the scan image type respectively.

DETAILED DESCRIPTION OF THE PREFERRED EMBODIMENT

This invention uses the scan size or scan area to help determine the final scanning resolution. The smaller the scan window size, the higher the scan resolution would be. There are a number of advantages for using the size of the scanned image to help determine the scanning resolution. The first advantage is that there is not a big penalty in data size. Because the scan resolution goes up as the scan size goes down the image files remain at a reasonable size. Yet at the same time a small image scanned at a high resolution can be used for a variety of output sizes without sacrificing output image quality. As more images are stored on a computer and reused multiple times this invention becomes more and more beneficial.

Letter sized paper is a typical paper size in the United States and is 8½×11 inches. A4 paper (8$^9$/$_{32}$×11$^{11}$/$_{16}$ inches) is also used and A4 paper is slightly longer and not quite as wide as letter sized paper. These paper sizes are typically the maximum paper sizes that computer printers and computer scanners are made to accommodate. When a scanning system scans a window that is 8½ inches wide or 11$^{11}$/$_{16}$ inches long it is unlikely that the resulting image will be enlarged when it is printed on a typical office printer. That is because the scanned image is already as large as the maximum printer output. However when a scanning system scans a window that is smaller than 8½ inches wide or 11$^{11}$/$_{16}$ inches long it is possible that the image will be enlarged when it is printed. The smaller the scanned window (or scanned area) the more likely it is that the scanned image will be enlarged when it is printed. Therefore as the scanning window or area to be scanned gets smaller, the final scanning resolution should get higher.

A scanner typically use illumination and optical systems to illuminate the object and focus a small area of the illuminated object, usually referred to as the "scan line", onto an optical photosensor array. This is typically called the scan width or X-direction. The entire object is then scanned by sweeping the illuminated scan line across the entire object, either by moving the object with respect to the illumination and optical assemblies, or by moving the illumination and optical assemblies relative to the object. This is typically called the scan length or Y-direction. The scan area would be a product of the scan length times the scan width or X * Y.

The final scan resolution is a function of an initial resolution, a resolution modifier, a printer factor, and an image factor. The resolution modifier, the printer factor and the image factor are dependent on the scan window size, the system printer, and the scan image type respectively.

Figure 1:
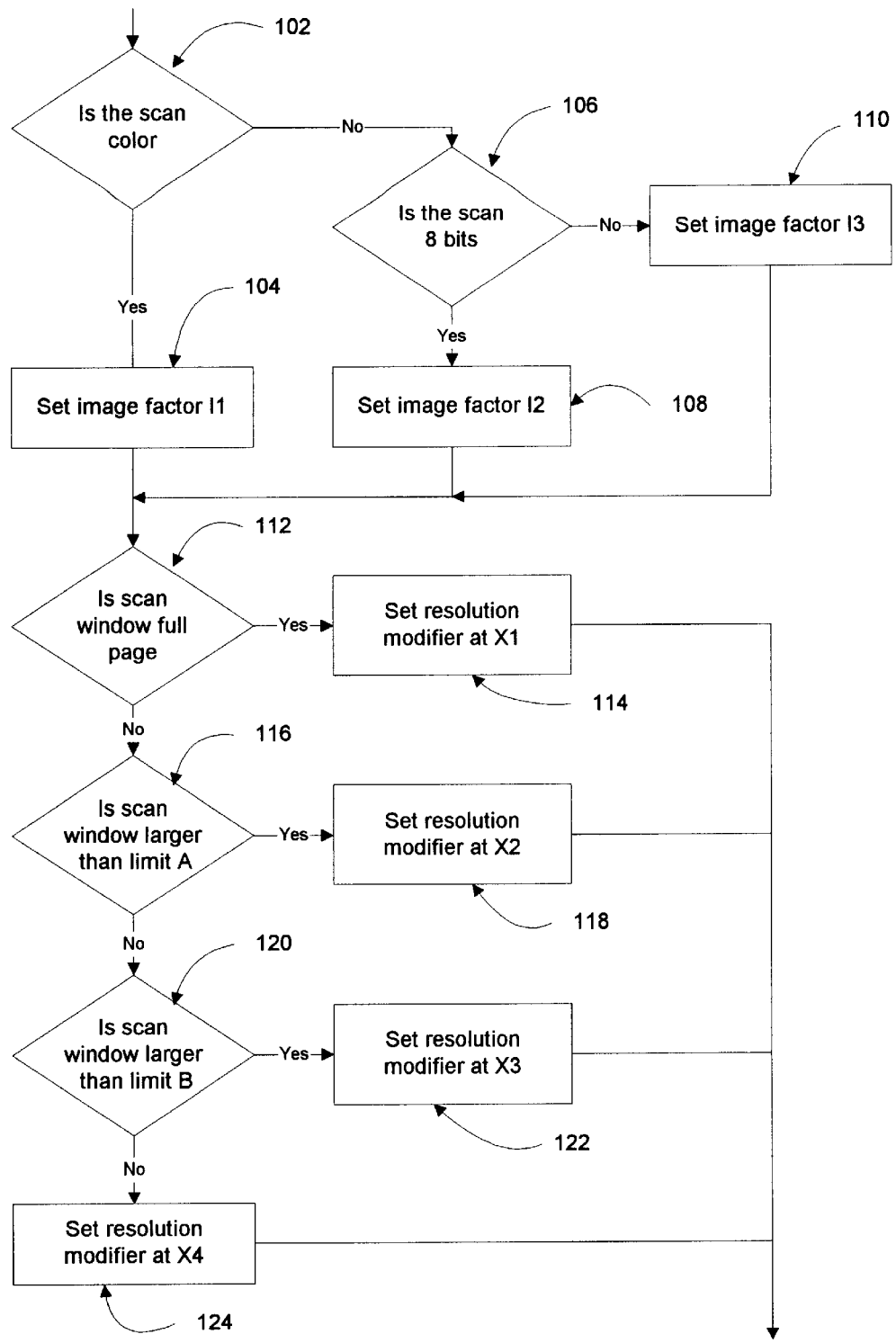
FIG. 1 is flow chart for setting the image factor and resolution modifier.

FIG. 1 shows a flow chart for setting an image factor and a resolution modifier. The image factor is determined by choosing the image factor that corresponds to the image type requested for the scan to be performed. In figure one in box 102 the image type is tested to determine if a color scan has been requested. If a color scan has been requested then the image factor is set to I1 in box 104. If the image type was not color then the image type is tested in box 106 to determine if the image type is 8 bit grayscale. If an 8 bit grayscale scan has been requested then the image factor is set to I2 in box 108. If the image type is not 8 bit grayscale then the image factor is set to I3 in box 110. Other image types (dithered, error diffused, 4 bit grayscale, or threshold image types) can be checked with a corresponding image factor being set.

Once the image factor is set the scanning window size or scanning area is examined. In box 112 the scan window size is checked to determine if either the scan width or scan length is equal to the corresponding maximum scanning width or maximum scanning length. If either of the scan window's length or width is set to the corresponding maximum window size then in box 114, the resolution modifier is set to X1. If neither of the scan window sizes matches the corresponding maximum sizes then the scan window is compared, in box 116, to size limit A.

Size limit A could have different limits A' and A" corresponding to the scanning length and scanning width. If the scan length is larger than size limit A' or the scanning width is larger than A" then the resolution modifier is set to X2 in box 118. If neither of the scan width or scan length is larger than the corresponding size limits A' and A" then the scan window is compared, in box 120, to size limit B.

Size limit B could have different limits B' and B" corresponding to the scanning length and scanning width. If the scan length is larger than size limit B' or the scanning width is larger than B" then the resolution modifier is set to X3 in box 122. If neither of the scan width or scan length is larger than the corresponding size limits B' and B" then the resolution factor is set to X4 in box 124.

More than 4 different resolution modifiers can be used. With the limit being one resolution modifier for each possible scan window size. However the increase in complexity of having more than 4 resolution factors offsets any advantages that might be gained. Other methods of choosing the resolution factors could be used. For example, the ratio of the scan area to the maximum scan area could be used to determine the resolution factor. Or a single one of the scan length or width could be used to determine the resolution factor.

Figure 2:
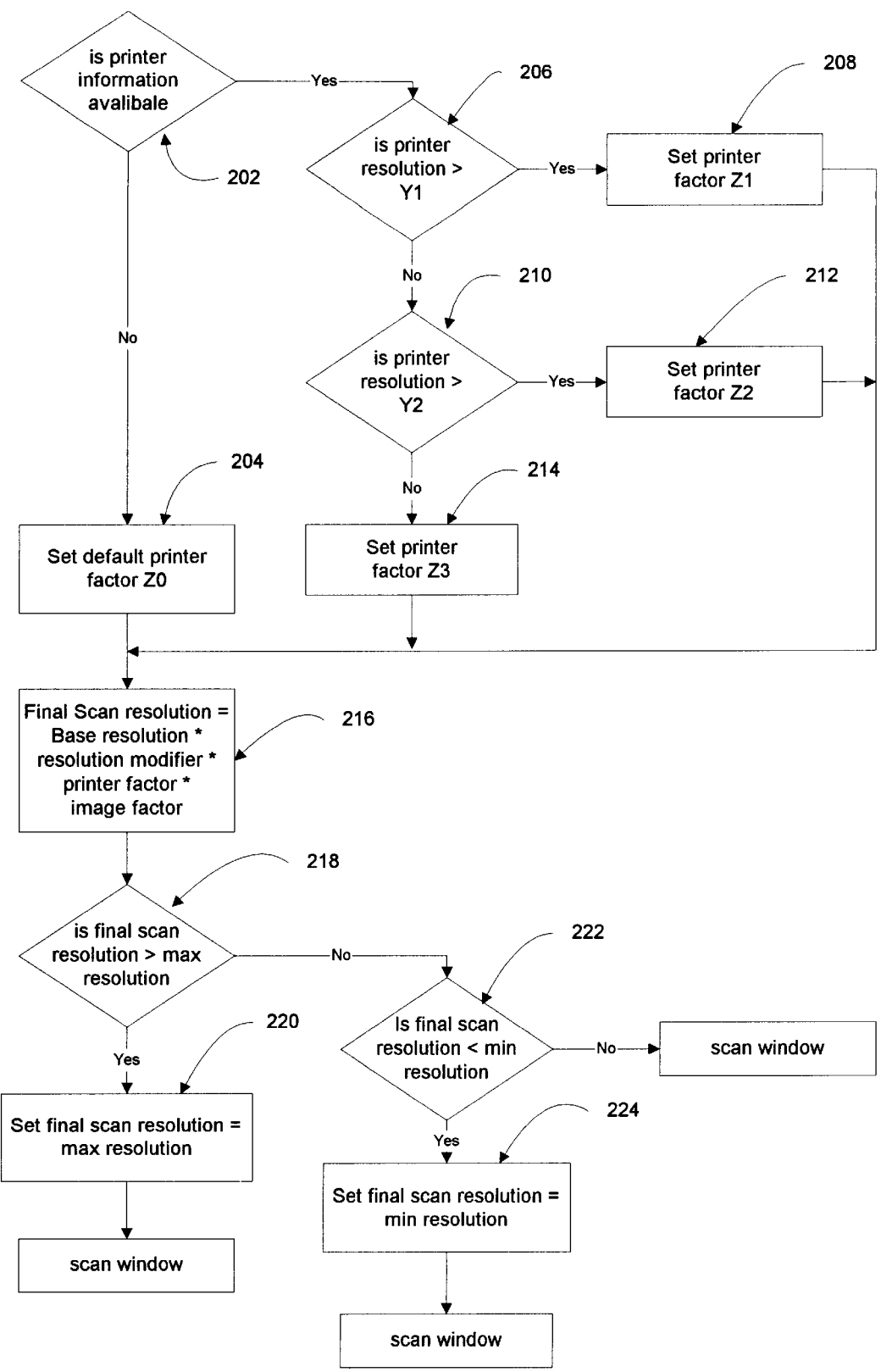
FIG. 2 is flow chart for setting the printer factor and calculating the final scan resolution.

In FIG. 2, box 202 the availability of the system printer information is determined. If the scanning system does not have or can not access information on the system printer then the printer factor is set to Z0 in box 204. If the system printer information is available then the system printer resolution is compared to limit Y1 in box 206. If the resolution of the system printer is greater than or equal to limit Y1 then the printer factor is set to Z1 in box 208. If the resolution of the system printer is less than limit Y1 then the resolution of the system printer is compared to limit Y2 in box 210. If the resolution of the system printer is greater than or equal to limit Y2 then the printer factor is set to Z2 in box 212. If the resolution of the system printer is less than the limit Y2 then the printer factor is set to Z3 in box 214. The order of determining the resolution factor, the image factor, and the printer factor is not important.

The final scan resolution is calculated in box 216 and is a function of an initial resolution, the resolution modifier, the printer factor, and the image factor. For example, let I1, I2, and I3 be set to ⅔, 1 and 2 respectively. Let X1, X2, X3, and X4 be set to 1, 2, 4, and 6 respectively. Let A' and A" be set to 4 inches and 5 inches respectively. Let B' and B" be set to 2 inches and 2.5 inches respectively. Let Y1 and Y2 be set to 600 dpi and 300 dpi respectively. Let Z0, Z1, Z2, and Z3 be set to 1, 1.5, 1, and 0.5 respectively. And let the initial resolution be set to 300 dpi. The final resolution of a color scan 1.5 inches by 1.5 inches that is requested on a system that does not have a system printer attached would be calculated as followed. In box 104 the image factor would be set to I1, which is ⅔, because the image is a color image.

In box 124 the resolution modifier would be set to X4, which is 6, because the scan window size is smaller than either B' (2 inches) or B" (2.5 inches). In box 204 the printer factor would be set to Z0, which is 1, because there is no system printer attached. The final scan resolution calculated in box 216 would be I1 * X4 * Z0 * 300=final scan resolution and is equal to (⅔)*(6)*(1)*(300)=1200 dpi.

The initial resolution can be combined with any one of the steps of determining the resolution factor, the printer factor or the image factor. For example, the initial resolution can be set at 300 pixels per inch and I1, I2, and I3 could be set at 1, ⅔, and ⅓ respectively or the initial resolution step could be combined with the image factor where I1, I2, and I3 would be 300, 200, and 100 respectively.

Once the final resolution has been calculated in box 216 it is checked in box 218 to make sure the calculated final resolution is not greater than the maximum resolution. If the calculated final resolution is greater than the maximum resolution then the final resolution is set to the maximum resolution in box 220. If the calculated final resolution is not larger than the maximum resolution it is compared to the minimum resolution in box 222. If the calculated resolution is smaller than the minimum resolution then the calculated resolution is set to the minimum resolution in box 224. Once the calculated resolution has been checked against the maximum and minimum levels and adjusted accordingly the scan is performed.

What is claimed is:

1. A method to determine a final scanning resolution for a scan, comprising:

determining an initial scanning resolution;

determining a scanning window for the scan, the scanning window having a size;

setting a resolution modifier, dependent on the size of the scanning window;

adjusting the initial scanning resolution, using the resolution modifier, to the final scanning resolution.

2. A method as in claim 1 further comprising:

determining at least one window size threshold;

setting the resolution modifier dependent on the comparison of the scanning window size to the window size threshold.

3. A method as in claim 1 further comprising:

determining a printer resolution;

comparing the printer resolution to at least one printing resolution threshold;

modifying the final scanning resolution, dependent on the comparison of the printer resolution and the printer resolution threshold.

4. A method as in claim 1 further comprising:

determining an image type for the scan;

setting an image factor dependent on the image type; modifying the final scanning resolution based on the image factor.

5. A method as in claim 2 further comprising:

determining an image type for the scan;

setting an image factor dependent on the image type; modifying the final scanning resolution based on the image factor.

6. A method as in claim 3 further comprising:

determining an image type for the scan;

setting an image factor dependent on the image type; modifying the final scanning resolution based on the image factor.

* * * * *